(12) United States Patent
Gettemy et al.

(10) Patent No.: US 7,034,802 B1
(45) Date of Patent: Apr. 25, 2006

(54) IMPLEMENTATION OF ELECTRONIC MUSCLES IN A PORTABLE COMPUTER AS USER INPUT/OUTPUT DEVICES

(75) Inventors: Shawn R. Gettemy, San Jose, CA (US); Yoon Kean Wong, Menlo Park, CA (US)

(73) Assignee: Palm, Incorporated, Sunnyvale, CA (US)

( * ) Notice: Subject to any disclaimer, the term of this patent is extended or adjusted under 35 U.S.C. 154(b) by 414 days.

(21) Appl. No.: 09/944,280

(22) Filed: Aug. 30, 2001

(51) Int. Cl.
*G09G 5/00* (2006.01)

(52) U.S. Cl. ............... 345/156; 345/169; 345/173

(58) Field of Classification Search ............ 345/156, 345/157, 158, 168, 169, 173, 174, 175, 176, 345/177, 178, 179, 184, 163
See application file for complete search history.

(56) References Cited

U.S. PATENT DOCUMENTS

| | | | | |
|---|---|---|---|---|
| 4,857,916 A | * | 8/1989 | Bellin | 340/5.52 |
| 5,838,138 A | * | 11/1998 | Henty | 320/107 |
| 6,160,540 A | * | 12/2000 | Fishkin et al. | 345/184 |
| 6,243,074 B1 | * | 6/2001 | Fishkin et al. | 345/156 |
| 6,243,075 B1 | | 6/2001 | Fishkin et al. | 345/156 |
| 6,411,283 B1 | * | 6/2002 | Murphy | 345/173 |

OTHER PUBLICATIONS

Pelrine et al.; "Dielectric Elastomers: Generator Mode Fundamentals and Applications"; SRI International, San Jose, CA; SPIE vol. 4329; Symposium 2001, Mar. 4-8, Newport Beach, CA.

Pelrine et al.; "Applications of Dielectric Elastomer Actuators"; SRI International, San Jose, CA; Danish Polymer Centre, Riso National Lab, Denmark, Danfoss A/S Micro Technology Group, Denmark; SPIE vol. 4329; Symposium 2001, Mar. 4-8, Newport Beach, CA.

* cited by examiner

*Primary Examiner*—Xiao Wu

(57) ABSTRACT

A portable computer system contained within a housing that comprises an electronic muscle material for performing a plurality of functions. The electronic muscle can be used to replace buttons or keys used in many PDAs. The movement of the electronic muscle material can charge the battery. When handled, the electronic muscle material can further detect the left- or right-handedness of the user and, based on the handedness, can generate function buttons or other alterations to accommodate the user's hand preference and finger placement. The electronic muscle can change shape to accommodate the user's hand for comfort and, further, as a security function to identify and authorize the user. Additionally, the electronic muscle material in the housing can be caused to vibrate at given frequencies so that it can generate an alarm and can function as a speaker or a dynamically directional microphone.

16 Claims, 11 Drawing Sheets

100a

DISPLAY MODULE SIDE VIEW
107

900

IMPLEMENTATION OF ELECTRONIC MUSCLES IN A PORTABLE COMPUTER AS USER INPUT/OUTPUT DEVICES

BACKGROUND OF THE INVENTION

1. Field of the Invention

The present invention relates to the field of portable computer systems, such as personal digital assistants or palmtop computer systems. Specifically, embodiments of the present invention relate to a portable computer system equipped with a dielectric elastomer actuator (e.g., an electronic muscle material) for navigating, vibrating, generating audio output and sensing a plurality of actions for which accommodations can be provided.

2. Related Art

A portable computer system, such as a personal digital assistant (PDA) or palmtop, is an electronic device that is small enough to be held in the hand of a user and is thus "palm-sized." By virtue of their size, portable computer systems are lightweight and so are exceptionally portable and convenient. These portable computer systems are generally contained in a housing constructed of conventional materials such as rigid plastics or metals.

Portable computer systems are generally powered using either rechargeable or disposable batteries. Because of the desire to reduce the size and weight of the portable computer system to the extent practical, smaller batteries are used. Thus, power conservation in portable computer systems is an important consideration in order to reduce the frequency at which the batteries either need to be recharged or replaced. Consequently, the portable computer system is placed into a low power mode (e.g., a sleep mode or deep sleep mode) when it is not actively performing a particular function or operation.

There are many other similar types of intelligent devices (having a processor and a memory, for example) that are sized in the range of laptops and palmtops, but have different capabilities and applications. Video game systems, cell phones, pagers and other such devices are examples of other types of portable or hand-held systems and devices in common use.

These systems, and others like them, have in common some type of screen for displaying images as part of a user interface. Many different kinds of screens can be used, such as liquid crystal displays, and field emission displays or other types of flat screen displays.

These systems also have in common some type of user interface allowing a user to input commands and information and to navigate either within an application or from one application to another. In the case of laptops and some of the other hand-held devices, an optional alphanumeric input device including alphanumeric and function keys (e.g., a keyboard) can be provided. The keyboard can also be used to control a cursor on the display device, or an optional cursor control device (e.g., a mouse, trackball, joystick, stylus, or touchpad) can be used. It is well known how a cursor can be used to select various functions, commands and applications, and how a cursor can be used to navigate within applications.

In the case of palmtops and other such devices, the display device is typically covered by a touch sensor (touchpad) which is able to register contact between the screen and the tip of a stylus element. The user can input commands and move between applications by touching the stylus to various parts of the screen or to virtual buttons rendered on the screen. Many palmtops are also equipped with a handwriting recognition pad (e.g., a graffiti area, digitizer or digitizer tablet) that can recognize characters traced on the pad by a user. Palmtops and many other hand-held devices also have built-in dedicated or programmable buttons or keys that can be used to implement various functions and to navigate among and within different applications (see FIG. 1).

Some portable computers contain speakers for audible alarms or for playing recorded messages. Likewise, they may contain microphones for recording information. Some also contain mechanisms that cause the device to vibrate when the audible alarm is turned off.

Thus, there are various well-known mechanisms that are used in the prior art to provide a user interface for hand-held and/or portable computer systems and the like, including laptops and palmtops. These mechanisms tend to work well with the different types of display devices and other mechanisms currently in use.

However, the paradigm of applying conventional user interface mechanisms to hand-held, portable devices does not take full advantage of the user's capability to control and manipulate such devices. The built-in dedicated buttons are not always located in a convenient place on the housing and are subject to mechanical failure, as are the speakers and microphones. Thus, it is desirable to provide a user-friendly interface that more fully utilizes the advantages afforded by the portability of hand-held devices. An improved interface can facilitate the user's experience and thus provide an advantage over other devices that employ conventional user interfaces.

A material called a dielectric elastomer has recently been introduced by Ron Pelrine, et. al. of SRI International. Information on this material is published in Proceedings of SPIE Vol. 4329 (Electroactive Polymer Actuators and Devices, 2001) from Smart Structures and Materials Symposium 2001, March 4–8, Newport Beach, Calif. This information is hereby incorporated by reference as background material.

SUMMARY OF THE INVENTION

Accordingly, what is needed is a system and/or method that can provide a user interface to perform many functions of the portable computer systems and other like devices using a technology such as a dielectric elastomer material as part of the user interface with the device. What is also needed is a system and/or method that can accomplish the above and that can also be used to enhance other functions or generate new functions of the device using existing material technologies. Furthermore, what is needed is a system and/or method that can accomplish the above and that can provide these functions for smaller hand-held devices. The present invention provides these advantages and others not specifically mentioned above but described in the sections to follow.

The preferred embodiment of the present invention pertains to a system and/or method that can provide a user interface to perform many functions of the computer systems and other like devices using a dielectric elastomer, hereafter referred to as "electronic muscle", material as part of the user interface with the device. Other functions of the device can be enhanced or new functions generated using existing material technologies. Furthermore, the present invention can achieve all the above and can provide these functions for smaller (e.g., hand-held) devices.

A portable computer system contained within a housing, which comprises an electronic muscle material for performing a plurality of functions, is disclosed. The electronic muscle material can be used as external buttons or keys to invoke PDA functions. In one embodiment the movement of the electronic muscle material can charge the battery. When handled, the electronic muscle material can further detect the left- or right-handedness of the user and, based on the handedness, can automatically generate function buttons, the placement of which may accommodate the user's hand preference and finger placement. The electronic muscle can change shape to accommodate the user's hand for comfort and, further, as a security function to identify and authorize the user. Additionally, the electronic muscle material in the housing can be caused to vibrate at given frequencies so that it can generate an alarm and can function as a speaker or a dynamically directional microphone.

The portable computer system that is described has a housing comprising an electronic muscle material which, when moved, causes the housing to behave in a prescribed manner. The housing contains a bus and there is a battery within the housing coupled to the bus. There is a processor coupled to the bus along with a display device for providing a visual display and a user interface for controlling the display.

In one embodiment, the movement of the electronic muscle material in the housing of the portable computer system can be used to charge the battery. In another embodiment, the movement of the electronic muscle material can also sense the handling by a user and can determine if the user is right-handed or left-handed. Once the location of the user's fingers, and thus the user's handedness, is sensed, function buttons for scrolling and/or selecting menu items can be generated in the proximity of the user's fingers from the electronic muscle material. Additionally, graphical user interface tools, e.g., a scroll bar, can be displayed along the side of the display module that best suits the user's handedness.

In one embodiment, the function buttons generated from the electronic muscle material can be caused to vibrate as an alarm to apprise the user of a relevant message being displayed. Similarly, the function buttons can be caused to protrude from the housing to apprise the user of a relevant message being displayed. Also, the entire electronic muscle material can be caused to vibrate as an alarm for apprising the user of a message being displayed.

In yet another embodiment, the electronic muscle material of the portable computer system can conform to the shape of user's hand for improved ergonomics. This conformance to the shape of the user's hand can identify the user for authorization purposes.

In another embodiment of this portable computer system, the electronic muscle material can be caused to vibrate at the frequency of external sound for use as a microphone. The electronic muscle material can, similarly, be caused to vibrate at the frequency of an analog or digital signal for use as a speaker. Another feature of this vibration is that the location of the vibration can move spatially about the housing for tracking the strongest signal.

Other features and advantages of the invention will become apparent from the following detailed description, taken in conjunction with the accompanying drawings, illustrating by way of example the principles of the invention.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

In the following detailed description of the present invention, numerous specific details are set forth in order to provide a thorough understanding of the present invention. However, it will be recognized by one skilled in the art that the present invention may be practiced without these specific details or with equivalents thereof. In other instances, well-known methods, procedures, components, and circuits have not been described in detail as not to unnecessarily obscure aspects of the present invention.

Notation and Nomenclature

Some portions of the detailed descriptions, which follow, are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussions, it is appreciated that throughout the present invention, discussions utilizing the following terms refer to the actions and processes of a computer system or similar electronic computing device. These devices manipulate and transform data that is represented as physical (electronic) quantities within the computer system's registers and memories or other such information storage, transmission or display devices. The aforementioned terms include, but are not limited to, "scanning" or "determining" or "generating" or "identifying" or "comparing" or "sorting" or "selecting" or "establishing" or "displaying" or "initiating" or the like.

Exemplary Palmtop Platform

Figure 1:
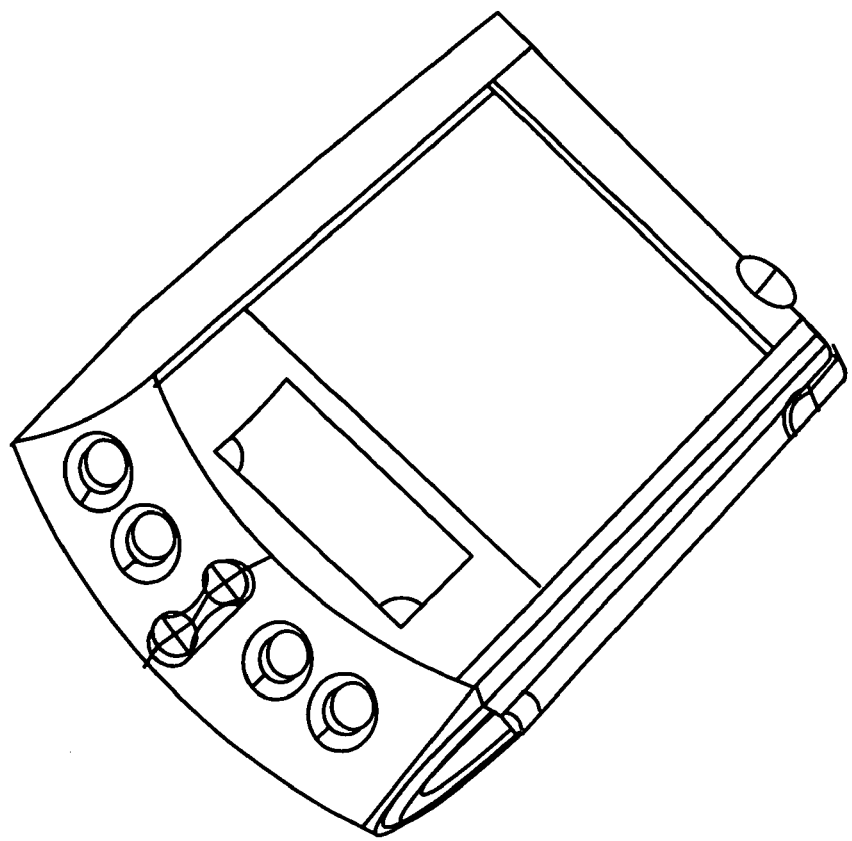
FIG. 1 illustrates a prior art electronic device with built-in dedicated buttons for scrolling or for selecting among menu items.
Figure 2:
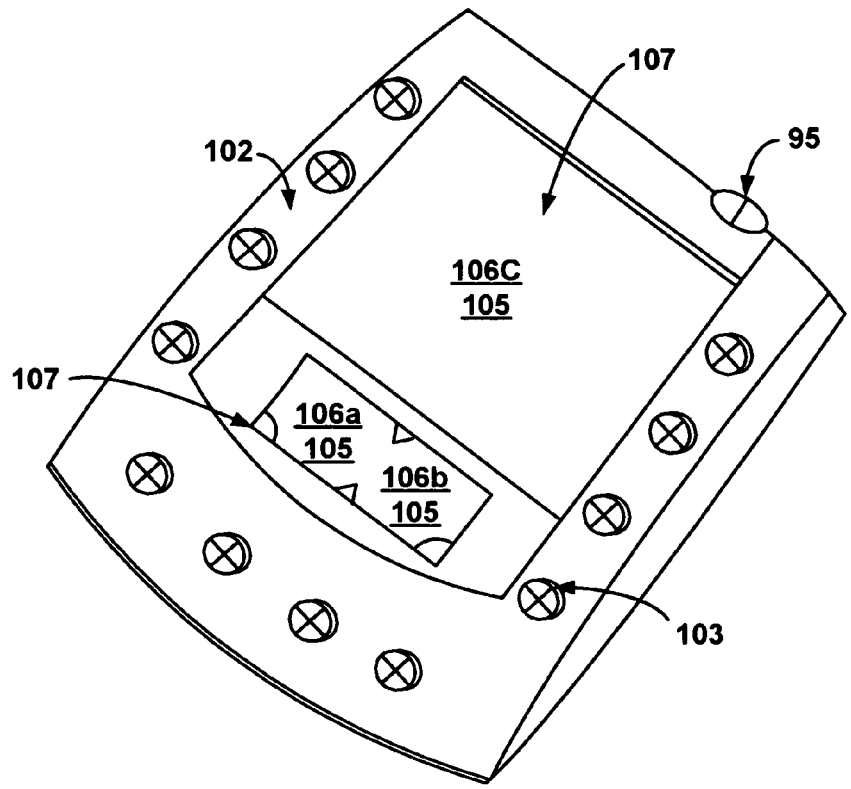
FIG. 2 is a topside perspective view of a portable computer system in accordance with one embodiment of the present invention.
Figure 2:
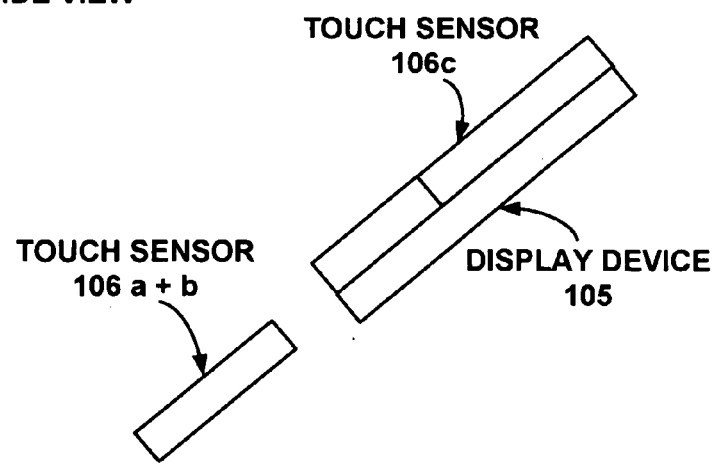

FIG. 2 is a perspective illustration of the top face 100a of one embodiment of the portable computer system 100 of the present invention. The housing 102 is layered with an electronic muscle material that is a gel-like polymer that can convert electrical energy to mechanical energy and, conversely, mechanical energy to electrical energy as it is expanded and contracted. By sensing the charge distribution across the material, one can determine the material's surface profile or contour. Vice-versa, by altering the charge distribution of the material, its surface profile can be altered. Alterations can be performed on localized portions of the material.

The top face 100a contains a display module 107 surrounded by a bezel or cover which is a portion of the housing and is layered with the electronic muscle material 102. The display module 107 comprises a display device 105 and touch sensors, 106 a, 106b and 106c which are able to register contact between the screen and the tip of a stylus or other similar input device. The stylus can be of any material to make contact with the touch sensors 106a, 106b, or 106c. In one embodiment icons 103 are silk-screened on the area of the bezel or cover, indicating locations where function buttons can be generated.

FIG. 2 also illustrates a handwriting recognition pad or "digitizer" containing two touch sensor regions 106a and 106b. Region 106a is for the drawing of alphabetic characters therein (and not for numeric characters) for automatic recognition, and region 106b is for the drawing of numeric characters therein (and not for alphabetic characters) for automatic recognition. A stylus or similar input device, is used for stroking a character within one of the regions 106a and 106b. The stroked information is then fed to an internal processor for automatic character recognition. Once characters are recognized, they are typically displayed on the display device 105 for verification and/or modification.

Figure 3:
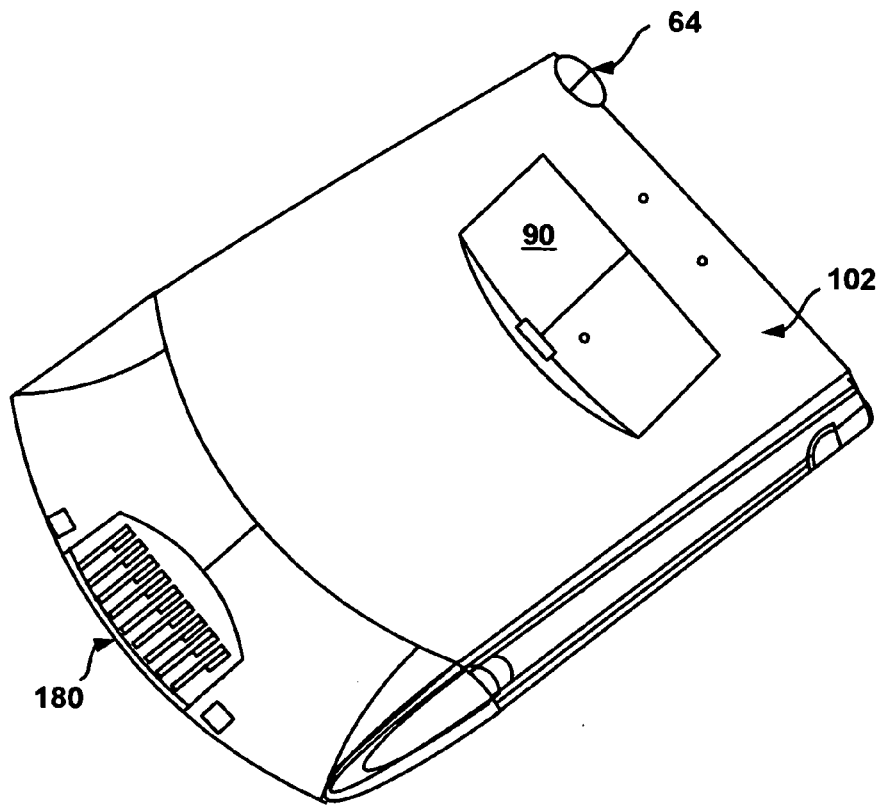
FIG. 3 is a bottom side perspective view of the portable computer system of FIG. 2.

FIG. 3 illustrates the bottom side 100b of one embodiment of the palmtop computer system that can be used in accordance with various embodiments of the present invention. A battery storage compartment door 90 is shown. A serial port 180 and an infrared port 64 are also shown. In one embodiment, infrared communication mechanism 64 is compliant with the IrDA (Infrared Data Association) standard and protocol.

Figure 4:
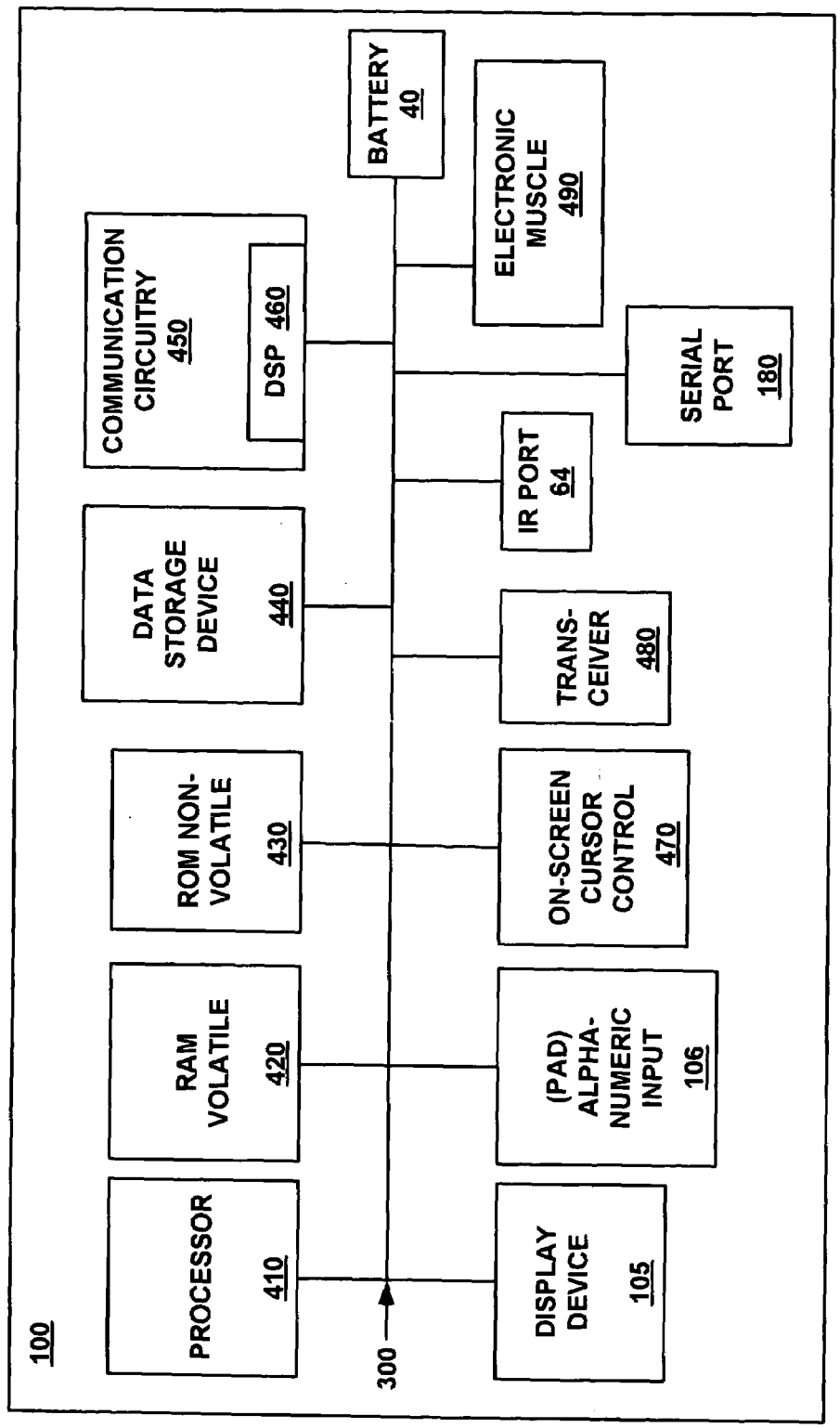
FIG. 4 is a block diagram of an exemplary portable computer system upon which embodiments of the present invention may be practiced.

FIG. 4 is a block diagram of one embodiment of a portable computer system 100 upon which embodiments of the present invention may be implemented. Portable computer system 100 is also often referred to as a PDA, a PID, a palmtop, or a hand-held computer system.

Portable computer system 100 includes an address/data bus 300 for communicating information, a central (main) processor 410 coupled with the bus 300 for processing information and instructions, a volatile memory 420 (e.g., random access memory, RAM) coupled with the bus 300 for storing information and instructions for the main processor 410, and a non-volatile memory 430 (e.g., read only memory, ROM) coupled with the bus 300 for storing static information and instructions for the main processor 410. Portable computer system 100 also includes an optional data storage device 440 (e.g., a memory card) coupled with the bus 300 for storing information and instructions. Device 440 may be removable. Portable computer system 100 also contains a display device 105 coupled to the bus 300 for displaying information to the computer user.

In the present embodiment, portable computer system 100 includes a transceiver 480 providing it with the capability for wireless communication. The transceiver 480 provides a wireless radio frequency (RF) or infrared (IR) communication link between computer system 100 and other devices, using any of the various RF or IR protocols and standards. In one embodiment, the Mobitex wireless communication specification is used. It is appreciated that transceiver 480 may be integrated into portable computer system 100, or that transceiver 480 may be a separate component coupled to portable computer system using, for example, serial port 180.

It is appreciated that, in another embodiment, portable computer system 100 may also include a telephony chipset or the like providing it with the functionality of a cellular phone, in particular the capability to transmit and receive cellular communications. In one embodiment, the telephony chipset is compatible with the standards for GSM and GPRS (Global System for Mobile Communications and General Packet Radio Service, respectively). It is appreciated that other telephony protocols and standards may also be used with the present invention.

In the present embodiment, portable computer system 100 of FIG. 3 includes communication circuitry 450 coupled to bus 300. In one embodiment, communication circuitry 450 is a universal asynchronous receiver-transmitter (UART) module that provides the receiving and transmitting circuits required for serial communication for both the serial port 180 and the infrared port 64. Communication circuitry 450 also includes digital signal processor (DSP) 460 for processing data to be transmitted or data that are received via transceiver 480.

Also included in computer system 100 is an optional alphanumeric input device 106 that, in one implementation, is a handwriting recognition pad ("digitizer"). Alphanumeric input device 106 can communicate information and command selections to main processor 410 via bus 300. In one implementation, alphanumeric input device 106 is a touch sensor device. Alphanumeric input device 106 is capable of registering a position where a stylus element (not shown) makes contact.

Portable computer system 100 also includes an optional cursor control or directing device (on-screen cursor control 470) coupled to bus 300 for communicating user input information and command selections to main processor 410. In one implementation, on-screen cursor control device 470 is a touch sensor device incorporated with display device 105. On-screen cursor control device 470 is capable of registering a position on display device 105 where a stylus element makes contact. The display device 105 utilized with portable computer system 100 may be a liquid crystal display (LCD) device, or other flat panel display device suitable for generating graphic images and alphanumeric characters recognizable to the user. In the preferred embodiment, display device 105 is a flat panel display.

The portable computer system 100 also includes a battery 40 coupled to bus 300 for powering the system when the computer is being used in the portable mode.

The electronic muscle material 490 that is comprised in the housing of the device is coupled such that it can be controlled by signals that are on bus 300 for interfacing with processor 410, communication circuitry 450, DSP 460, and/or battery 40. In the present embodiment this electronic muscle material 490 is the dielectric elastomer material described herein. When this electronic muscle material 490 is stretched and then allowed to contract, the elastic stresses work against electric field pressure and increase electrical energy. Thus, in one embodiment, as pressure is applied to the housing comprising this material, an electric charge is created which can then charge the battery 40, eliminating the need for external charging devices. As the PDA is handled daily, the battery can thus be recharged.

Figure 5:
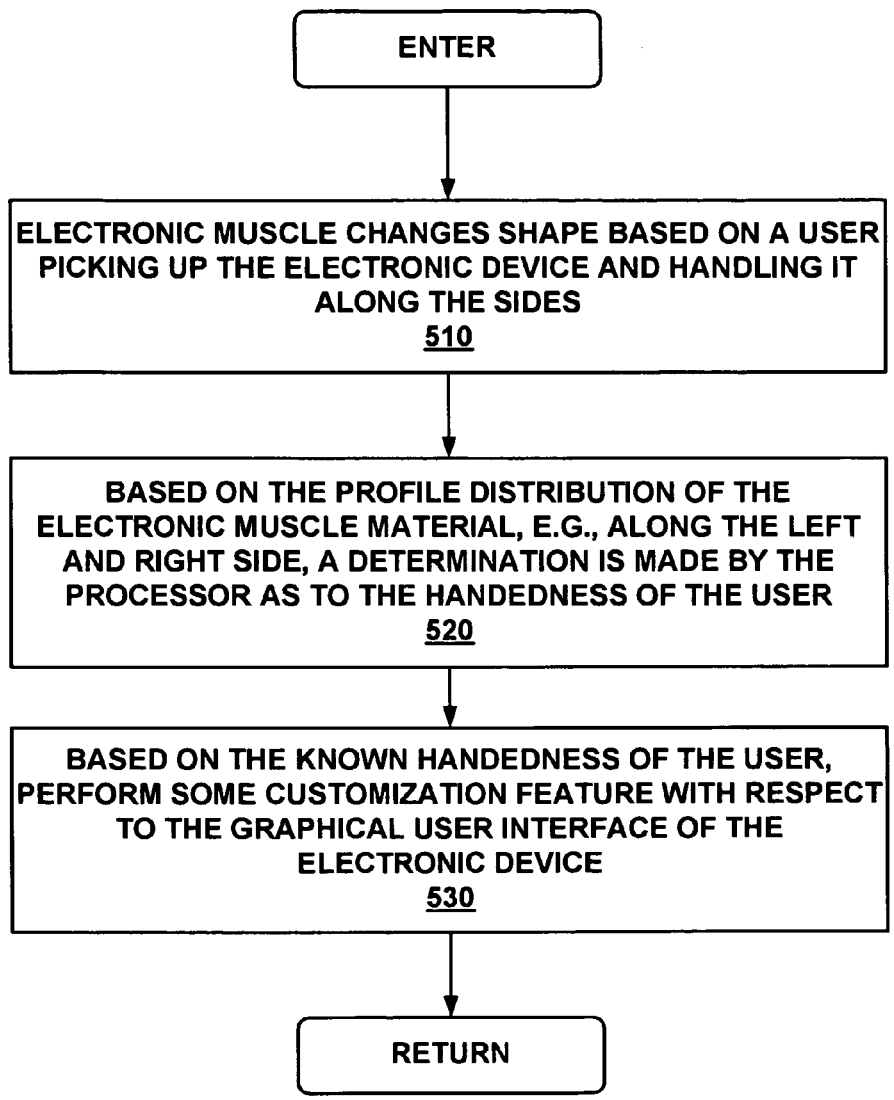
FIG. 5 is a block diagram illustrating the generation of customized features based on the user's left- or right-handedness.
Figure 6:
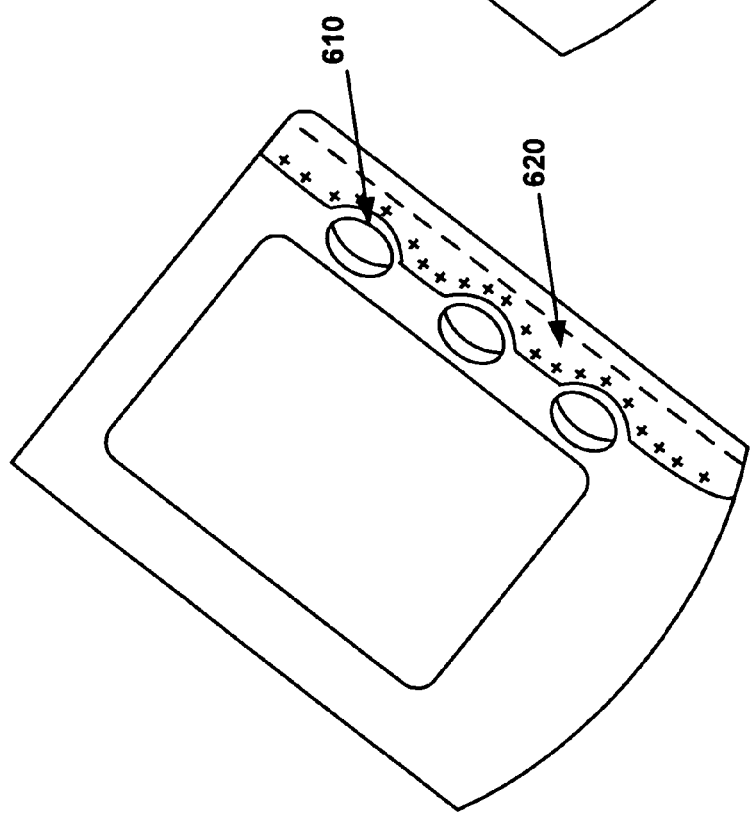
FIG. 6 illustrates the electronic muscle material sensing the contour of finger placement according to one embodiment of the present invention.

FIG. 5 is a block diagram illustrating the process 500 of generating customized features by the electronic muscle material in one embodiment of the invention. Block 510 indicates the sensing, by the electronic muscle material comprised in the device, of the device being picked up by a user up and handled along the sides. Block 520 includes the determination by the processor, based on the profile of the electrical charge distribution on the electronic muscle material, of the location of hand and/or finger placement on the housing of the device and, thus the handedness of the user. FIG. 6 further illustrates how the pressing 610 of the electronic muscle redistributes the charges 620. The strength of the charge and its distribution can then be interpreted to determine the hand and/or finger placement.

Figure 7:
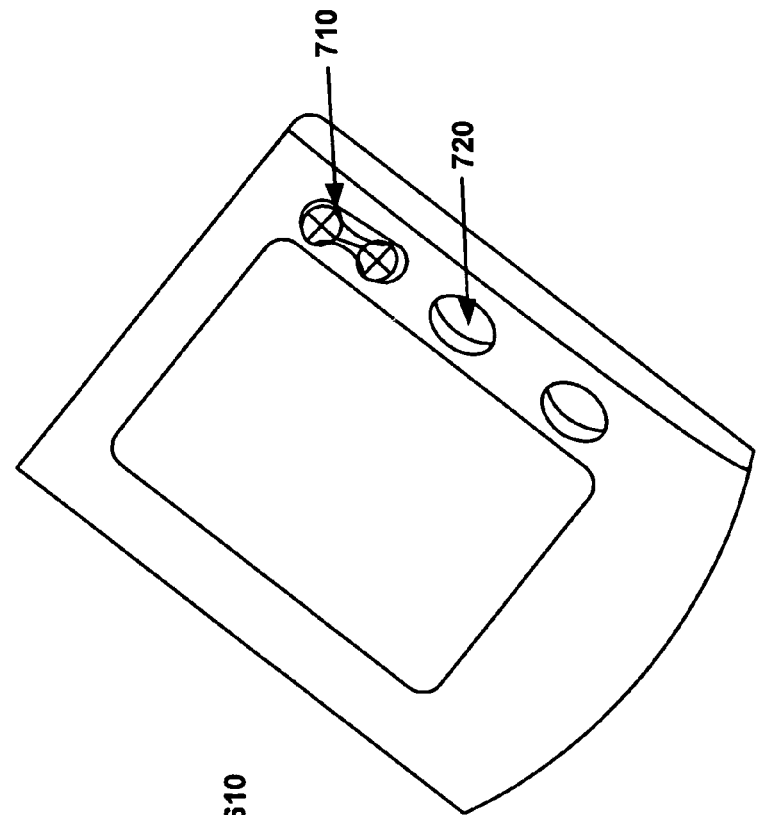
FIG. 7 illustrates an exemplary configuration for function button placement.

Block 530 of FIG. 5 represents the performance of some customization feature, based on the known handedness of the user, with respect to the user interface of the electronic device. In one embodiment of the present invention this customization feature is the generation of function buttons in closest proximity to the user's fingers, once the hand and finger placements are sensed. These buttons could be scroll buttons 710 or menu selection buttons 720, as illustrated by FIG. 7.

Figure 8A:
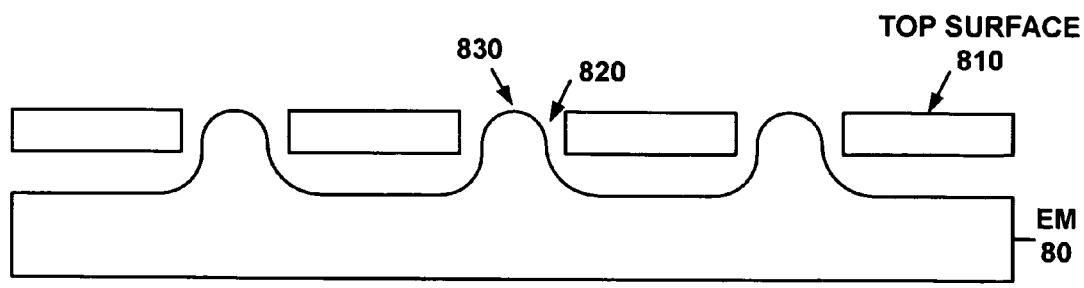
FIG. 8 is a figure illustrating the generation of function buttons in three embodiments of the present invention.

Referring now to FIG. 8a, in one embodiment the top surface of the housing 810 is comprised of a layer of rigid or semi-rigid material (e.g., plastic) covering the electronic muscle material 80. In this embodiment there would be openings in the top surface 820 at designated locations along the sides of the housing. Depending on the handedness of the user, the electronic muscle material 80 would grow buttons 830 through the openings in the housing along the side corresponding to the determined handedness of the user.

Figure 8B:
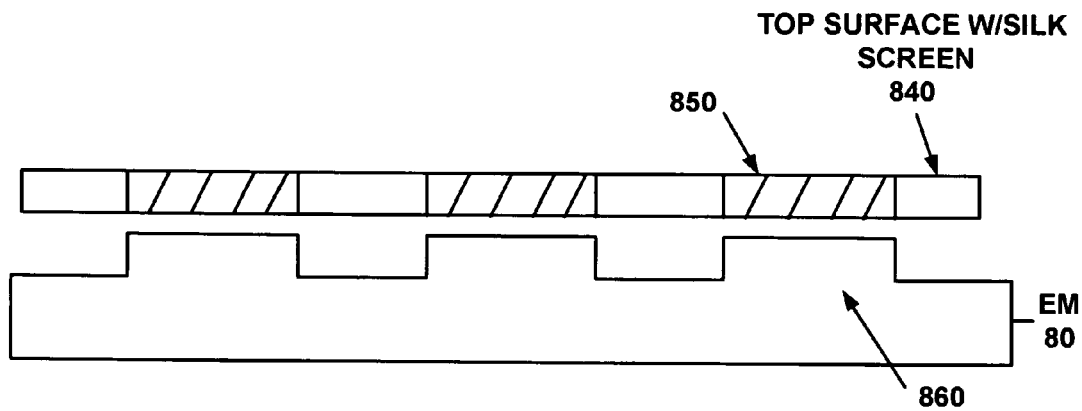

In the embodiment of the present invention illustrated by FIG. 8b, the top surface of the housing 840 is comprised of a layer of rigid or semi-rigid material covering the electronic muscle material. Icons 850 representing the functions of the user interface are silk-screened on the top layer of the housing 840. When the icon 850 is pressed by the user, the electronic muscle material 80 beneath the top layer becomes the button 860 to send a signal to the processor to perform the designated function.

Figure 8C:
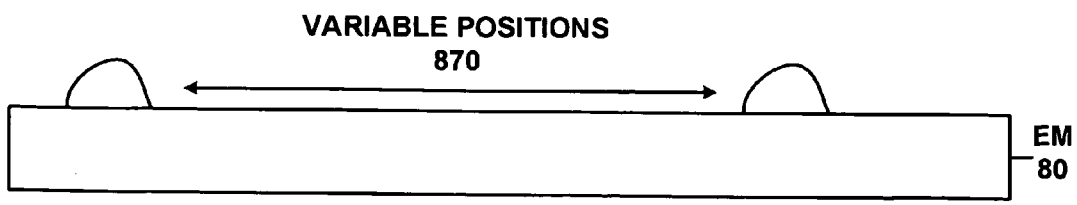

FIG. 8c illustrates one embodiment of the present invention in which the electronic muscle 80 forms the outer layer of the housing. The function buttons are created by the electronic muscle material in any of a plurality of variable positions 870. The positions for the buttons would be in the proximity of the user's fingers, depending on the determined handedness and finger position of the user.

This determination of handedness and finger placement followed by the generation of buttons in the proximity of the fingers improves the user interface. In the prior art, a left-handed person with large fingers needing to operate the device with a single hand could find it difficult to manipulate the buttons, and their hand could obscure portions of the screen. The present invention would facilitate single-handed use of the portable computer or device.

Figure 9:
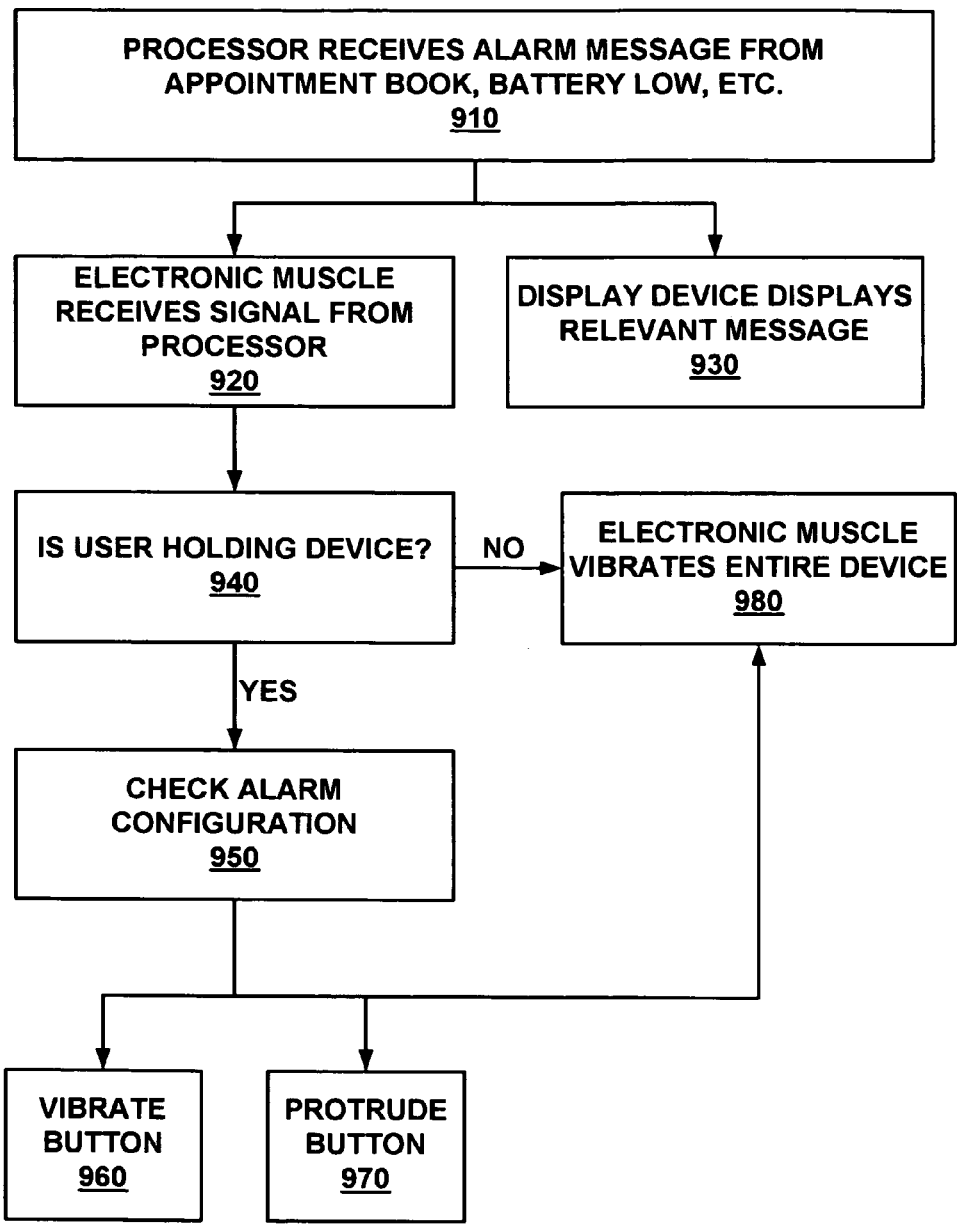
FIG. 9 is a block diagram illustrating the process followed for generating alarms in one embodiment of the present invention.

FIG. 9 is a block diagram 900 illustrating alarming and messaging using the electronic muscle material of the present invention. In one embodiment, the processor receives an alarm message from a source such as an appointment calendar, low battery sensor, etc. as shown in block 910. The processor then issues a signal to the electronic muscle and to the display device. The display device displays, as shown in block 930, a relevant message to inform the user of the source of the alarm.

Still referring to FIG. 9, the electronic muscle senses 920 if the user is holding 940 the device. If not, the entire electronic muscle vibrates 980, thereby vibrating the portable computer for apprising the user that an alarm message is being displayed. If the device is being held 940, the alarm configuration is checked 950 to determine the alarm configuration setting. If the configuration is set to vibrate 960 a button, then the electronic muscle will vibrate at the appropriate button location. If the configuration is set to protrude 970 a button, the electronic muscle will expand at the location of the appropriate button to cause it to protrude. If the device is configured to alarm by vibrating the entire device, then that mode is employed 980.

In another embodiment, the alarm configuration could require an audible alarm in which case the electronic muscle material can function as a speaker to issue said alarm. This function is covered in more detail below with reference to FIG. 12.

Figure 10:
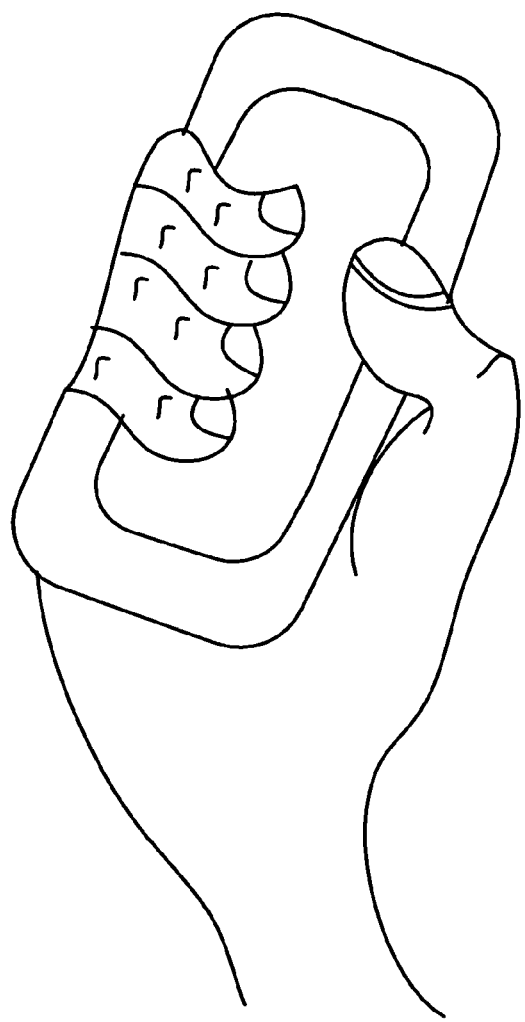
FIG. 10 illustrates the conformance of the housing to the contour of the user's hand in one embodiment of the present invention

Referring now to FIG. 10, one embodiment of the present invention is illustrated in which the exterior or peripheral placed electronic muscle material comprised in the housing conforms to the shape of the user's hand. The electronic muscle material has a high elastic modulus and is capable of easily molding to the hand's contour. This characteristic functions to create a more comfortable device for the user. The user can alternately squeeze and release the housing of the device containing the gel-like electronic muscle material, thus exercising the user's hand and wrist while simultaneously charging the battery 40 in the device per FIG. 4.

Figure 11:
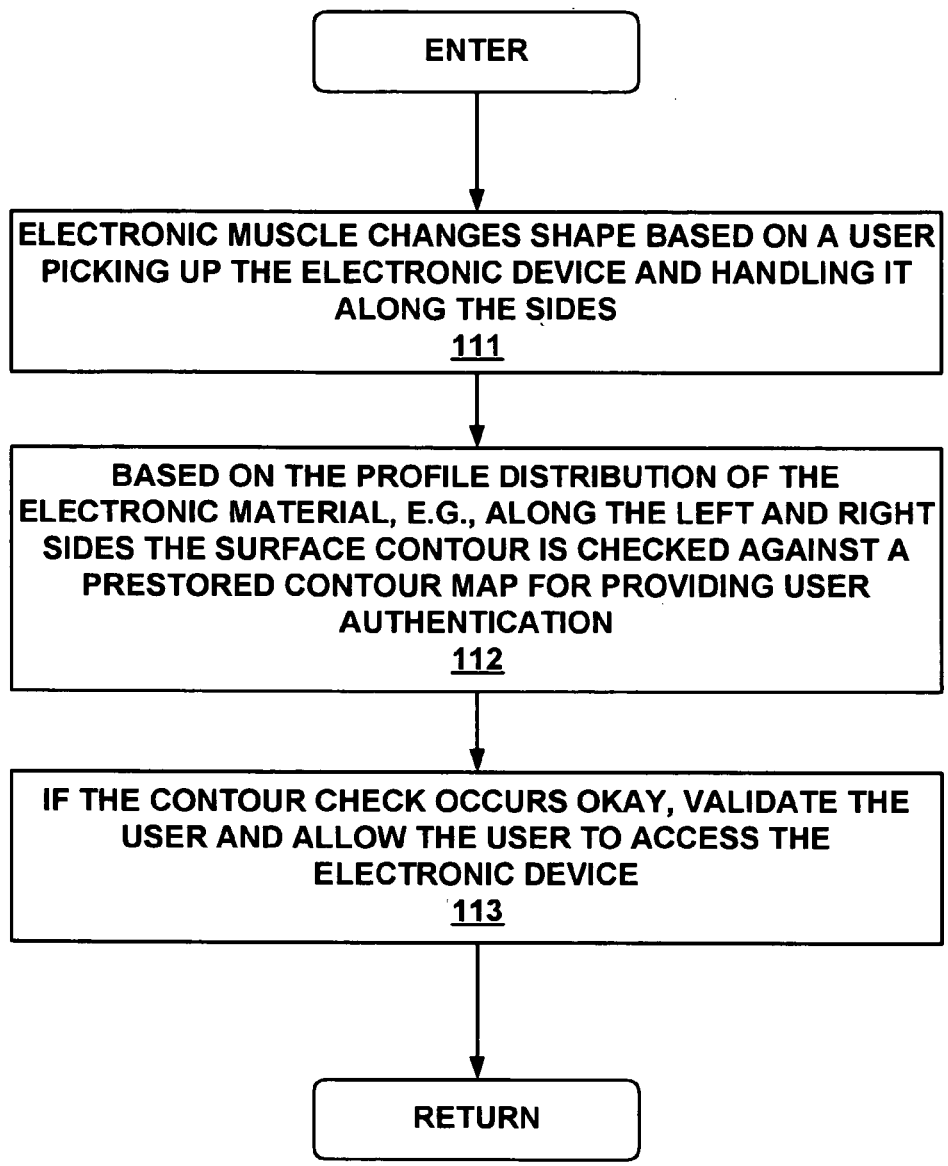
FIG. 11 is a block diagram illustrating the validation of the user utilizing the contour of the user's hand.

Referring now to FIG. 11, when a user picks up and handles the electronic device 111, the electronic muscle material changes shape to conform to the users hand. Based on the profile of the charge distribution in the electronic muscle material, e.g., along the left and right sides, the surface contour is checked 112 against a pre-stored contour map of the conformance to the authorized user's hand to identify the user and to authorize 113 his/her access to the device, in one embodiment of the present invention.

Figure 12:
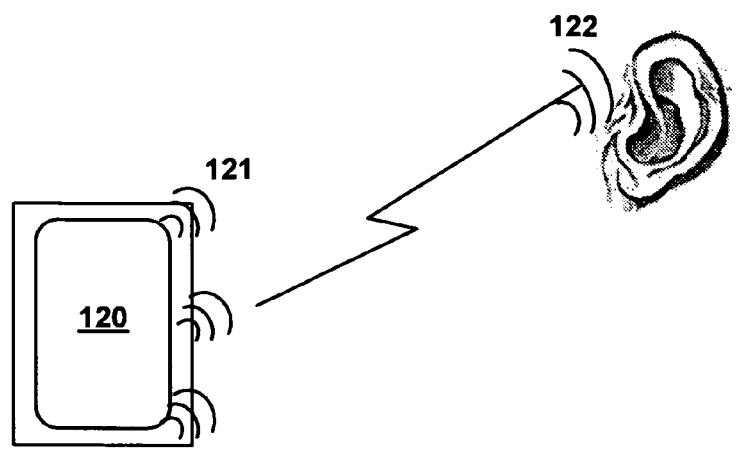
FIG. 12 illustrates one embodiment of the present invention in which the electronic muscle material functions as a speaker.

FIG. 12 illustrates the use of the device housing 120, comprising the electronic muscle material, as a speaker. The characteristics of this material include good impedance matching to many energy sources. Thus, the electronic muscle material can be caused to vibrate 121 at prescribed frequencies, modulating the surrounding air and producing sound 122. This eliminates the need to include within the present invention separate speaker devices for producing sound. Additionally, the speaker can be localized at any position along the electronic muscle material and can therefore be spatially adjusted to an optimum position for the best user experience.

Figure 13:
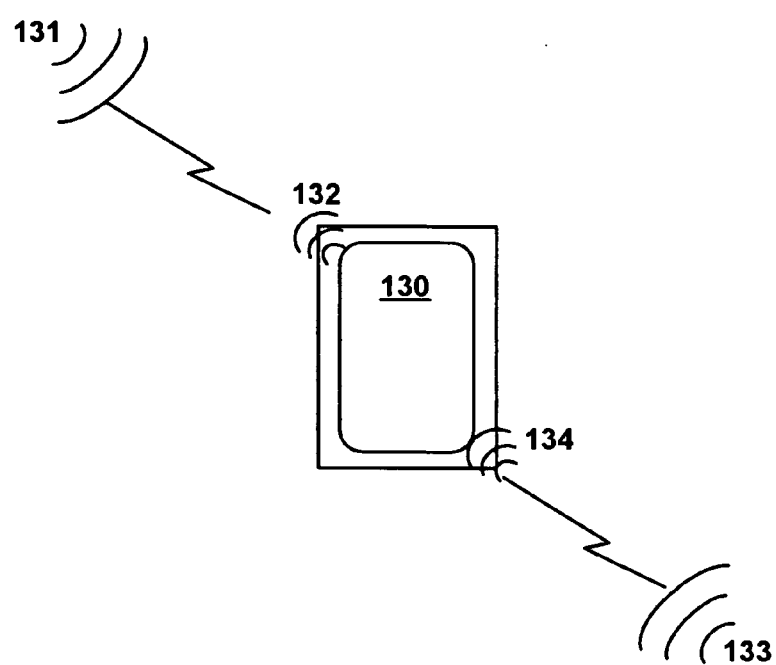
FIG. 13 illustrates one embodiment of the present invention in which the electronic material functions as a dynamically directional microphone.

Likewise, as shown in FIG. 13, the electronic muscle can vibrate in response to signals from external sources. The electronic muscle of the device can sense the direction from which the sound emanates. The vibration can move dynamically around the housing 130 to receive the greatest signal strength. This allows for the provision of a variable position microphone. At a meeting in a conference room, for example, the sound from an attendee speaking from location 131 would set up a vibration in the electronic muscle of the housing of device 130 at location 132. Likewise, the sound from someone speaking at location 133 would set up a vibration at location 134. These signals can then be stored and later regenerated by the speaker function discussed with FIG. 12.

In summary, embodiments of the present invention provide the user of portable computer devices with interfaces for performing a plurality of tasks. The housing of the device in the present invention comprises a dielectric elastomer material known as an electronic muscle material. This housing provides an automatic battery-charging interface. It provides the capability of adapting the scroll and menu function button locations to ones most convenient to the user. It provides said buttons as an integral part of the housing, eliminating the potential failures that can occur in mechanical buttons of the prior art. The housing can vibrate in part or entirety to apprise the user of an alarm message. The housing can also conform to the contour of the user's hand for improved ergonomics and can use this conformation for identification and authorization of the user. Further, the electronic muscle material of the housing of the device can vibrate to modulate the air so as to function as a speaker and a microphone integral with the device.

The present invention has been described in the context of a portable computer system; however, the present invention may also be implemented in other types of devices having, for example, a housing and a processor, such that the device performs certain functions on behalf of the processor. Furthermore, it is appreciated that these certain functions may include functions other than those associated with navigating, vibrating, sensing and generating audio output.

The preferred embodiment of the present invention, implementation of electronic muscles in a portable computer for navigation, vibration, audio output and as a general sensor, is thus described. While the present invention has been described in particular embodiments, it should be appreciated that the present invention should not be construed as limited by such embodiments, but rather construed according to the below claims.

What is claimed is:

1. A portable computer system comprising:
   a bus;
   a processor coupled to said bus;
   a housing comprising a dielectric elastomer electronic muscle material, said dielectric elastomer electronic muscle material, when moved, causing said processor to behave in a prescribed manner and wherein said electronic muscle material conforms to the shape of user's hand for improved ergonomics and wherein said conformance to shape of user's hand generates contour data which is used by said processor to identify a user for purpose of user authorization;
   a display device coupled to said bus and for providing a visual display; and
   wherein said processor implements a user interface for controlling said display.

2. The portable computer system of claim 1 further comprising a battery and wherein movement of said electronic muscle material causes charging of said battery.

3. The portable computer system of claim 1 wherein movement of said electronic muscle material causes said processor to sense handling by user for determination of left-handedness or right-handedness thereof.

4. The portable computer system of claim 3 wherein in response to said determination of handedness said electronic muscle material generates a plurality of function buttons in the proximity of user's fingers.

5. The portable computer system of claim 4 wherein any of said plurality of function buttons vibrate to apprise user of relevant message being displayed.

6. The portable computer system of claim 4 wherein any of said plurality of function buttons protrudes from said housing to apprise user of relevant message being displayed.

7. The portable computer system of claim 1 wherein said electronic muscle material vibrates for apprising the user of a message being displayed.

8. The portable computer system of claim 1 wherein said electronic muscle material vibrates at a frequency of external sound for use as a microphone.

9. The portable computer system of claim 8 wherein the location of said vibration moves spatially about the housing for tracking a strongest sound signal.

10. The portable computer system of claim 1, wherein said electronic muscle material vibrates at a frequency as specified by said processor for use as a speaker.

11. A portable computer system comprising:
    a bus;
    a processor coupled to said bus;
    a housing comprising a dielectric elastomer electronic muscle material, said dielectric elastomer electronic muscle material, when moved, causing said processor to behave in a prescribed manner and wherein said electronic muscle material conforms to the shape of user's hand for improved ergonomics and wherein said conformance to shape of user's hand generates contour data which is used by said processor to identify a user for purpose of user authorization;
    a display device coupled to said bus and for providing a visual display;
    a battery, wherein stretching and contraction of said electronic muscle material causes charging of said battery based on a change of an electrical property of said electronic muscle; and
    wherein said processor implements a user interface for controlling said display.

12. The portable computer system of claim 11 wherein movement of said electronic muscle material causes said processor to sense handling by user for determination of left-handedness or right-handedness thereof.

13. The portable computer system of claim 12 wherein in response to said determination of handedness said electronic muscle material generates a plurality of function buttons in the proximity of user's fingers.

14. The portable computer system of claim 13 wherein any of said plurality of function buttons vibrate to apprise user of relevant message being displayed.

15. The portable computer system of claim 13 wherein any of said plurality of function buttons protrudes from said housing to apprise user of relevant message being displayed.

16. The portable computer system of claim 11 wherein said electronic muscle material vibrates for apprising the user of a message being displayed.

* * * * *